(12) United States Patent
Tanaka et al.

(10) Patent No.: US 12,300,781 B2
(45) Date of Patent: May 13, 2025

(54) FLUORIDE ION SECONDARY BATTERY

(71) Applicant: HONDA MOTOR CO., LTD., Tokyo (JP)

(72) Inventors: Akihisa Tanaka, Saitama (JP); Yoshiyuki Morita, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 461 days.

(21) Appl. No.: 17/767,452

(22) PCT Filed: Oct. 9, 2019

(86) PCT No.: PCT/JP2019/039887
§ 371 (c)(1),
(2) Date: Apr. 8, 2022

(87) PCT Pub. No.: WO2021/070301
PCT Pub. Date: Apr. 15, 2021

(65) Prior Publication Data
US 2023/0261253 A1 Aug. 17, 2023

(51) Int. Cl.
*H01M 10/0562* (2010.01)
*H01M 4/36* (2006.01)
(Continued)

(52) U.S. Cl.
CPC ....... *H01M 10/0562* (2013.01); *H01M 4/362* (2013.01); *H01M 4/463* (2013.01);
(Continued)

(58) Field of Classification Search
CPC .. H01M 10/0562; H01M 4/362; H01M 4/463; H01M 4/58
See application file for complete search history.

(56) References Cited

U.S. PATENT DOCUMENTS

2016/0087308 A1  3/2016  Nakamoto et al.
2016/0190597 A1  6/2016  Kim et al.
(Continued)

FOREIGN PATENT DOCUMENTS

CN  105742583 A   7/2016
CN  106067544 A  11/2016
(Continued)

OTHER PUBLICATIONS

Wang et al. (Sci. Adv. 2017;3: e1701301, Sep. 2017).*
(Continued)

*Primary Examiner* — Olatunji A Godo
(74) *Attorney, Agent, or Firm* — CKC & PARTNERS CO., LLC

(57) ABSTRACT

The present invention provides a fluoride ion secondary battery which has high initial charge/discharge efficiency, while starting with a charged state and having a high voltage. According to the present invention, a composite body is formed using, as negative electrode active materials, nanometer-sized aluminum particles and modified aluminum fluoride together with the other constituents of a negative electrode mixture, said modified aluminum fluoride having voids that are formed by deintercalation of fluoride ions; and a fluoride ion secondary battery is configured by combining a negative electrode, which uses this composite body, with a positive electrode that contains a specific substance as a positive electrode active material.

6 Claims, 3 Drawing Sheets

(51) Int. Cl.
*H01M 4/46* (2006.01)
*H01M 4/58* (2010.01)
*H01M 4/02* (2006.01)

(52) U.S. Cl.
CPC ........ *H01M 4/58* (2013.01); *H01M 2004/027* (2013.01); *H01M 2004/028* (2013.01)

(56) References Cited

U.S. PATENT DOCUMENTS

| | | | |
|---|---|---|---|
| 2016/0315311 A1 | 10/2016 | Jeon et al. | |
| 2017/0062805 A1 | 3/2017 | Nakamoto et al. | |
| 2017/0092939 A1* | 3/2017 | Kim | H01M 10/0569 |
| 2019/0363358 A1 | 11/2019 | Choi et al. | |
| 2020/0274158 A1 | 8/2020 | Kageura et al. | |

FOREIGN PATENT DOCUMENTS

| | | |
|---|---|---|
| JP | H11260405 A | 9/1999 |
| JP | 2000106154 A | 4/2000 |
| JP | 2016062821 A | 4/2016 |
| JP | 2017050113 A | 3/2017 |
| JP | 2018059703 A | 4/2018 |
| WO | 2019098384 A1 | 5/2019 |
| WO | 2019187943 A1 | 10/2019 |

OTHER PUBLICATIONS

Office Action issued in the CN Patent Application No. 201980101218.7, mailed on Nov. 1, 2023.
C. Rongeat et al., "Development of new anode composite materials for fluoride ion batteries", J. Mater. Chem. A, 2014. 2. 20861-20872.
Le Zhang et al., "Study of all solid-state rechargeable fluoride ion batteries based on thin-film electrolyte", J. Solid State Electroehem (2017) 21: 1243-1251.
Carine Rongeat et al., "Solid Electrolytes for Fluoride Ion Batteries: Ionic Conductivity in Polycrystalline Tysonite-Type Fluorides", ACS Appl. Mater. Interfaces 2014, 6, 2103-2110.
Carine Rongeat et al., "Nanostructured Fluorite-Type Fluorides As Electrolytes for Fluoride Ion Batteries", J. Phys. Chem. C 2013, 117, 4943-4950.
A. Duvel, et al., "Mechanosynthesis of the Fast Fluoride Ion Conductor Ba1-xLaxF2+x: From the Fluorite to the Tysonite Structure", J. Phys. Chem. C 2014, 118, 7117-7129.

* cited by examiner

FLUORIDE ION SECONDARY BATTERY

TECHNICAL FIELD

The present invention relates to fluoride ion secondary batteries.

BACKGROUND ART

Conventionally, as secondary batteries having a high energy density, lithium ion secondary batteries are widely used. The lithium ion secondary battery has a structure in which a separator is present between a positive electrode and a negative electrode and a liquid electrolyte (electrolytic liquid) is filled.

Since the electrolytic liquid of the lithium ion secondary battery is generally a flammable organic solvent, in particular, there may be a problem in safety for heat. Hence, instead of an organic liquid electrolyte, a solid-state battery using an inorganic solid electrolyte is proposed (see Patent Document 1).

As the battery using the solid electrolyte as described above, a secondary battery using fluoride ions is also considered (see Patent Document 2). A fluoride ion secondary battery is a secondary battery which uses a fluoride ion ($F^-$) as a carrier, and it is known that the fluoride ion secondary battery has high theoretical energy. It is expected that the battery characteristics thereof exceed those of the lithium ion secondary battery.

Here, as a negative electrode active material for the fluoride ion secondary battery, for example, $NgF_2$, $CaF_2$, $CeF_3$ and the like are reported (see Non-Patent Documents 1 and 2). However, in the fluoride ion secondary batteries using these negative electrode active materials, the charge/discharge efficiency thereof is 10 to 20%, and thus the energy efficiency thereof serving as a secondary battery was disadvantageously low. The charge/discharge capacity thereof is only about 10 to 20% of a theoretical capacity, and thus a high capacity was not achieved as compared with the lithium ion secondary battery and an Ni-MH battery which are currently used.

As the solid electrolyte used in the fluoride ion secondary battery, for example, $La_{1-x}Ba_xF_{3-x}$ where x=0.01 to 0.2 (hereinafter referred to as an LBF) is mentioned (see Non-Patent Documents 1 to 4). As shown in FIG. 1, the reduction side potential window of the LBF receives a constraint at −2.41 V vs. $Pb/PbF_2$ which is the potential of $La/LaF_3$ calculated from Gibbs energy.

By contrast, as the potentials of the negative electrode active materials for the fluoride ion secondary battery which are currently reported, as shown in FIG. 1, $MgF_2$ has a potential of −2.35 to −2.87 V vs. $Pb/PbF_2$, $CaF_2$ has a potential of −2.85 to −2.89 V vs. $Pb/PbF_2$ and $CaF_3$ has a potential of −2.18 to −2.37 V vs. $Pb/PbF_2$. Hence, under the constraint of −2.41 V serving as the reduction potential window of the LBF, the defluorination/refluorination reactions of the negative electrode active materials described above could not be provided with consideration given to the overvoltage thereof.

For this requirement, Patent Document 3 focuses attention on aluminum fluoride ($AlF_3$: −1.78 V vs. $Pb/PbF_2$) in which charge/discharge reactions (defluorination/refluorination reactions) are present in the constraint of −2.41 V serving as the potential window of the LBF that is the fluoride ion solid electrolyte, and further proposes a negative electrode active material obtained by modifying the aluminum fluoride ($AlF_3$) such that fluoride ions ($F^-$) are previously and partially desorbed from the structure of the perfect crystal of six-coordinated octahedron included in the aluminum fluoride ($AlF_3$) and that pores are provided in positions where fluorine atoms were present.

In the negative electrode active material of Patent Document 3, the pores which are provided in the positions where fluorine atoms were present serve as the starting point of the defluorination/refluorination reactions, and thus it is possible to cause a desired negative electrode reaction at a high utilization rate in a reversible manner.

Patent Document 1: Japanese Unexamined Patent Application, Publication No. 2000-106154
Patent Document 2: Japanese Unexamined Patent Application, Publication No. 2017-050113
Patent Document 3: Japanese Patent Application No. 2018-059703
Non-Patent Document 1: J. Mater. Chem. A. 2014.2.20861-20872
Non-Patent Document 2: J. Solid State Electrochem (2017) 21:1243-1251

DISCLOSURE OF THE INVENTION

Problems to be Solved by the Invention

However, in the fluoride ion secondary battery using the negative electrode active material proposed in Patent Document 3, the electrification efficiency of an electrochemical first cycle is about 50%, and thus the capacity thereof is significantly lowered in the first charge and discharge.

Since in the fluoride ion secondary battery using the negative electrode active material proposed in Patent Document 3, a compound which includes fluoride ions is selected as a positive electrode serving as the opposite electrode, the fluoride ion secondary battery is a battery which starts from discharge. However, in terms of stability of an active material within an electrode, the manufacturing of a secondary battery is preferably performed in a discharged state where an energy state is low. In other words, the secondary battery is preferably a battery which starts from charge.

Furthermore, in the fluoride ion secondary battery using the negative electrode active material proposed in Patent Document 3, a discharge voltage is about 1.5 V, and thus a higher voltage is required.

The present invention is made in view of the background technologies described above, and an object thereof is to provide a fluoride ion secondary battery which has high initial charge/discharge efficiency, starts from charge and provides a high voltage.

Means for Solving the Problems

The present inventors have conducted thorough studies on the cause of the reduction in the electrification efficiency of the negative electrode active material proposed in Patent Document 3. Then, the present inventors have considered that the aluminum fluoride formed by the refluorination reaction after the defluorination coats the surface of the negative electrode active material to form an insulating layer, and that thus the reactivity is lowered.

In addition, the present inventors have considered that since the negative electrode active material is nanoparticles, the particles are agglomerated at the time of initial charge/discharge, and that consequently, an electron conduction path and an ion conduction path are not sufficiently formed.

The present inventors further have considered that, when a compound capable of discharging fluoride ions serving as an ion carrier at the time of charge can be caused to be present as the negative electrode active material, it is possible to form a battery using, as a positive electrode, a compound which does not include fluoride ions.

Then, the present inventors have found that when nanoparticle-sized aluminum and a modified aluminum fluoride material having pores caused by desorption of fluoride ions are used as the negative electrode active material to form a composite together with the other components of a negative electrode material mixture, and a negative electrode using the composite and a positive electrode including a specific material as a positive electrode active material are combined to form a fluoride ion secondary battery, it is possible to solve the problems described above, with the result that the present invention is completed.

Specifically, a fluoride ion secondary battery according to the present invention includes: a negative electrode; a solid electrolyte; and a positive electrode, wherein the negative electrode includes a negative electrode material mixture composite including a negative electrode active material and a fluoride ion conductive fluoride, the negative electrode active material includes aluminum and a modified aluminum fluoride material having pores caused by desorption of fluoride ions, the positive electrode includes a positive electrode active material, and the positive electrode active material is copper.

The pores may serve as a starting point of a defluorination reaction and a refluorination reaction.

The pores may be a region where fluorine atoms were present in the aluminum fluoride before modification.

The aluminum may be in the form of particles with an average particle diameter of 10 nm to 200 nm.

The negative electrode material mixture composite for a fluoride ion secondary battery may further include carbon black.

The modified aluminum fluoride material may contain lithium.

Effects of the Invention

The fluoride ion secondary battery of the present invention has high initial charge/discharge efficiency, starts from charge and provides a high voltage.

PREFERRED MODE FOR CARRYING OUT THE INVENTION

Figure 1:
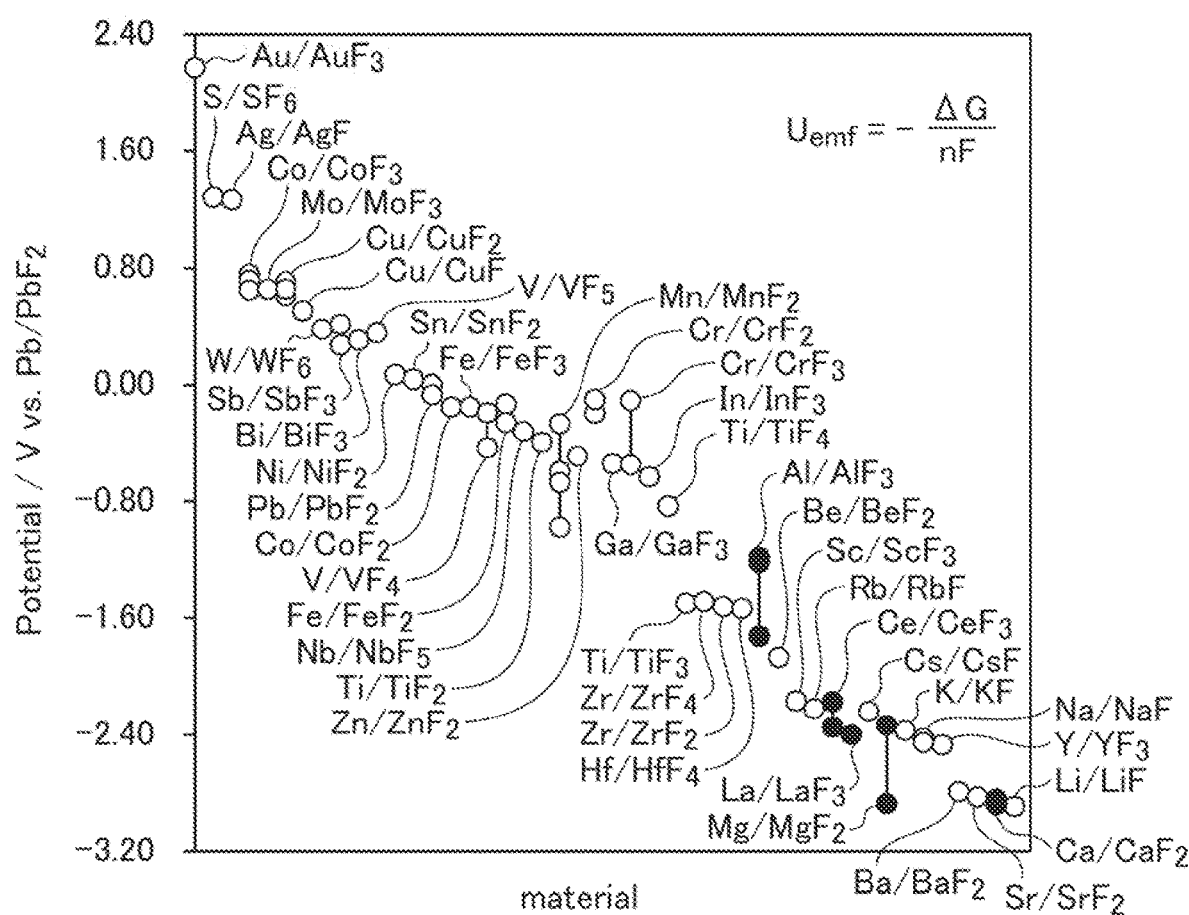
FIG. 1 is a diagram showing potentials calculated from Gibbs energy.

An embodiment of the present invention will be described below.

<<Fluoride Ion Secondary Battery>>

The fluoride ion secondary battery of the present invention includes a negative electrode for a fluoride ion secondary battery, a solid electrolyte and a positive electrode for a fluoride ion secondary battery.

<Negative Electrode for Fluoride Ion Secondary Battery>

The negative electrode of a fluoride ion secondary battery needs to be able to store fluoride ions ($F^-$) at the time of discharge and to discharge fluoride ions ($F^-$) at the time of charge.

The negative electrode for a fluoride ion secondary battery which forms the fluoride ion secondary battery of the present invention includes a negative electrode material mixture composite for a fluoride ion secondary battery that includes a negative electrode active material and a fluoride ion conductive fluoride. The negative electrode material mixture composite for a fluoride ion secondary battery will be described below. As long as the negative electrode material mixture composite for a fluoride ion secondary battery is included, the other configurations are not particularly limited.

For example, the negative electrode for a fluoride ion secondary battery can be obtained by applying, on a current collector, a mixture including the negative electrode material mixture composite for a fluoride ion secondary battery which will be described later and a binder and drying the mixture.

[Negative Electrode Material Mixture Composite for Fluoride Ion Secondary Battery]

The negative electrode material mixture composite for a fluoride ion secondary battery used in the present invention includes the negative electrode active material and the fluoride ion conductive fluoride, and the negative electrode active material includes aluminum and a modified aluminum fluoride material having pores caused by desorption of fluoride ions.

The negative electrode material mixture composite for a fluoride ion secondary battery used in the present invention preferably includes, as constituent components, aluminum and the modified aluminum fluoride material serving as the negative electrode active material and the fluoride ion conductive fluoride, and may be a composite which arbitrarily includes other components.

In the negative electrode material mixture composite for a fluoride ion secondary battery used in the present invention, aluminum serving as the negative electrode active material forms an alloy with another constituent component of the composite, and aluminum is not present as a simple substance.

[Shape of Composite]

The shape of the negative electrode material mixture composite for a fluoride ion secondary battery used in the present invention is not particularly limited. Among various shapes, the negative electrode material mixture composite is preferably granulated into spherical particles. Within each of the particles, aluminum and the modified aluminum fluoride material serving as the negative electrode active material, the fluoride ion conductive fluoride and other arbitrary components are preferably present.

In a case where the negative electrode material mixture composite is granulated into spherical particles, when the electrode is pressed, the electrode into which the negative electrode material mixture composite is further filled without any gap can be produced, with the result that the volumetric energy density of the battery can be enhanced.

When the negative electrode material mixture composite is spherical, the constituent components of the composite are present within each of the composite particles, and thus an electron conduction path and an ion conduction path for fluorination/defluorination reactions necessary for an electrochemical reaction can be formed into nanosized paths.

In order to enhance the efficiency of the electrochemical reaction in the fluoride ion secondary battery, it is effective to enlarge the surface area of the materials of the negative electrode, and when the negative electrode material mixture composite is spherical, a negative electrode for a fluoride ion secondary battery which is the aggregate of spheres has a high surface area. Consequently, a contact area with a solid electrolyte included in an adjacent solid electrolyte layer can be increased.

(Average Particle Diameter)

When the negative electrode material mixture composite for a fluoride ion secondary battery used in the present invention is in the form of spherical particles, the average particle diameter thereof is preferably in a range of 0.5 to 10 μm. The average particle diameter is particularly preferably in a range of 1 to 5 μm.

The average particle diameter of the negative electrode material mixture composite for a fluoride ion secondary battery is in the range described above, and thus when grinding and mixing processing for obtaining the composite particles is performed, the particles are made to collide with each other so as to be granulated, with the result that within the microsized particles, the electron conduction path and the ion conduction path for fluorination/defluorination reactions are securely adhered and formed. Since the structure of the particles having the electron conduction path and the ion conduction path can follow a change in volume caused by the reaction of aluminum serving as the negative electrode active material, the collapse of the structure of a negative electrode layer can be suppressed, with the result that the reversibility of the electrochemical reaction can be more improved.

[Negative Electrode Active Material]

The negative electrode active material of the negative electrode material mixture composite for a fluoride ion secondary battery used in the present invention includes aluminum and the modified aluminum fluoride material having pores caused by desorption of fluoride ions.

[Aluminum]

As shown in FIG. 1, the potential of aluminum fluoride $AlF_3$ which is a fluoride of aluminum is −1.78 V vs. $Pb/PbF_2$, and charge/discharge reactions (defluorination/refluorination reactions) are present in the constraint of −2.41 V serving as the potential window of an LBF which is a fluoride ion solid electrolyte.

Hence, the defluorination/refluorination reactions of aluminum sufficiently proceed under the constraint of −2.41 V serving as the reduction potential window of the LBF with consideration given to the overvoltage thereof. Since aluminum is an inexpensive material, it is economically advantageous to use aluminum.

On the surface of aluminum, an oxide film may be present.

(Shape)

The shape of aluminum serving as the negative electrode active material is preferably spherical. The negative electrode active material is spherical, and thus when the electrode is pressed, the electrode into which the negative electrode active material is further filled without any gap can be produced, with the result that the volumetric energy density of the battery can be enhanced.

(Average Particle Diameter)

The aluminum is preferably in the form of particles with an average particle diameter in a range of 10 to 200 nm, particularly preferably in a range of 40 to 100 nm.

When the aluminum serving as the negative electrode active material is in the form of particles with an average particle diameter in the range of 10 to 200 nm, the resulting negative electrode material mixture composite for a fluoride ion secondary battery can be a substantially true spherical granulated composite.

[Modified Aluminum Fluoride Material Having Pores Caused by Desorption of Fluoride Ions]

In the present invention, the modified aluminum fluoride material serving as the negative electrode active material has pores caused by desorption of fluoride ions.

(Pores)

As described above, the pores in the modified aluminum fluoride material are formed by desorption of fluoride ions, and serve as the starting point of the defluorination/refluorination reactions. Specifically, the pores are present, and thus the aluminum fluoride ($AlF_3$) that is an insulator whose conductivity is substantially zero ionically and electronically is modified, with the result that it is possible to cause a negative electrode reaction to proceed at a high utilization rate in a highly reversible manner.

The pores are formed in a region where fluorine atoms were present in the aluminum fluoride ($AlF_3$) before being modified. The aluminum fluoride ($AlF_3$) before being modified has a structure of six-coordinated octahedron in which an Al atom is arranged in the center and six fluorine atoms are arranged at the vertex. In the modified aluminum fluoride material used in the present invention, among the six fluorine atoms present at the vertex, part of the fluorine atoms are removed, and positions where the fluorine atoms which were removed and desorbed were present serve as pores.

In the modified aluminum fluoride material used in the present invention, not all of the six fluorine atoms in the aluminum fluoride ($AlF_3$) are desorbed, only part of the fluorine atoms are removed and thus pores are provided.

(Method for Manufacturing Modified Aluminum Fluoride Material)

In a method for manufacturing the modified aluminum fluoride material used in the present invention, the aluminum fluoride and an alkali metal or an alkali earth metal are brought into contact to desorb fluoride ions from the aluminum fluoride, and thus the positions where the fluorine atoms desorbed as the fluoride ions were present serve as pores.

The alkali metal or the alkali earth metal whose potential is lower than the potential of the defluorination/refluorination reactions of the aluminum fluoride ($AlF_3$) is brought into contact to form a fluoride, and thus a reaction occurs in which part of the fluorine atoms are removed from the aluminum fluoride ($AlF_3$).

In the modified aluminum fluoride material used in the present invention, not all of the six fluorine atoms in the aluminum fluoride ($AlF_3$) are desorbed. In other words, only part of the fluorine atoms are removed, and thus a reaction in which the aluminum fluoride ($AlF_3$) is changed into aluminum metal is prevented from occurring.

The aluminum fluoride ($AlF_3$) absorbs water in the atmosphere to form 0.5 hydrate or 3 hydrate which is more stable. Hence, when the aluminum fluoride is modified, the aluminum fluoride ($AlF_3$) which has been subjected to dehydration treatment is preferably used. As a method for performing the dehydration treatment, for example, a method for performing vacuum burning at a temperature of about 250 to 300° C. or the like is mentioned.

The alkali metal or the alkali earth metal which is brought into contact with the aluminum fluoride before being modified is not particularly limited. Examples of the alkali metal can include lithium (Li), sodium (Na), potassium (K), rubidium (Rb), cesium (Cs) and the like, and examples of the alkali earth metal can include magnesium (Mg), calcium (Ca), strontium (Sr), barium (Ba) and the like.

Among them, lithium (Li) metal is preferably used. Since the lithium (Li) metal is the lightest of all metal elements, the capacity (mAh/g) per weight of the active material can be enhanced. In other words, the modified aluminum fluoride material used in the present invention preferably includes lithium.

As a commercially available lithium (Li) metal, for example, Li foil made by Honjo Metal Co., Ltd. (purity of 99.8%) and the like are mentioned. Although the shape of the lithium (Li) metal is not particularly limited, since it is easy to mix it with the aluminum fluoride (AlF$_3$), the shape of a chip or the shape of beads is preferable.

An example of the reaction which occurs when the aluminum fluoride (AlF$_3$) and the alkali metal or the alkali earth metal are brought into contact is shown below. The following is the reaction of the lithium (Li) metal which is an alkali metal and the aluminum fluoride (AlF$_3$).

$$x\text{Li} + (1-x)\text{AlF}_3$$

$$\rightarrow x\text{LiF} + (1-x)\text{AlF}_{3-4x/(1-x)} \quad (1)$$

$$\rightarrow x\text{LiF} + (1-4x/3)\text{AlF}_3 + (x/3)\text{Al} \quad (2)$$

$$\rightarrow (x/3)\text{Li}_3\text{AlF}_6 + (1-5x/3)\text{AlF}_3 + (x/3)\text{Al} \quad (3)$$

In the manufacturing of the modified aluminum fluoride material used in the present invention, the reaction is prevented from proceeding to the stages of formula (2) and formula (3) where the aluminum fluoride (AlF$_3$) is changed into aluminum metal, and the reaction is stopped at the stage of formula (1) where only part of the fluorine atoms are removed.

A method for bringing the aluminum fluoride (AlF$_3$) and the alkali metal or the alkali earth metal into contact is not particularly limited as long as the method is used in which the reaction is prevented from proceeding such that the aluminum fluoride (AlF$_3$) is changed into aluminum metal.

For example, a method is mentioned in which the necessary amount of aluminum fluoride (AlF$_3$) and the necessary amount of alkali metal or alkali earth metal are weighed, preliminary mixing is performed as necessary and mixing is performed with a ball mill or the like.

Since the aluminum fluoride (AlF$_3$) and the alkali metal or the alkali earth metal are highly reactive with water, they are preferably brought into contact in an environment where it is possible to prevent contact with water in the atmosphere by use of a glove box or the like.

The ratio of the alkali metal or the alkali earth metal which is used to the total of the alkali metal or the alkali earth metal and the aluminum fluoride is preferably 5 to 20 mol %. The ratio is 5 to 20 mol %, and thus a large charge/discharge capacity is obtained, and simultaneously, a reaction overvoltage is reduced, with the result that it is possible to form a fluoride ion secondary battery in which the charge/discharge efficiency is increased.

The ratio of the alkali metal or the alkali earth metal to the total of the alkali metal or the alkali earth metal and the aluminum fluoride is further preferably 5 to 15 mol %, and is most preferably 10 to 15 mol %.

[Fluoride Ion Conductive Fluoride]

The fluoride ion conductive fluoride which is an essential constituent component of the negative electrode material mixture composite for a fluoride ion secondary battery according to the present invention is not particularly limited as long as the fluoride ion conductive fluoride is a fluoride having fluoride ion conductivity. For example, Ce$_{0.95}$Ba$_{0.05}$F$_{2.95}$, Ba$_{0.6}$La$_{0.4}$F$_{2.4}$ and the like are mentioned.

Among them, Ce$_{0.95}$Ba$_{0.05}$F$_{2.95}$ is preferably used because it has high ion conductivity.

(Average Particle Diameter)

The fluoride ion conductive fluoride is preferably in the form of particles with an average particle diameter in a range of 0.1 to 100 μm, particularly preferably in a range of 0.1 to 10 μm.

When the fluoride ion conductive fluoride is in the form of particles with an average particle diameter in the range of 0.1 to 100 μm, it is possible to form an electrode of a thin film having relatively high ion conductivity.

[Other Components]

The negative electrode material mixture composite for a fluoride ion secondary battery used in the present invention may arbitrarily include other components other than aluminum and the modified aluminum fluoride material serving as the negative electrode active material and the fluoride ion conductive fluoride which are essential constituent components. Examples of the other components include a conductive aid, a binder and the like.

(Conductive Aid)

In particular, the negative electrode material mixture composite for a fluoride ion secondary battery used in the present invention preferably includes carbon black as the conductive aid. The carbon black is present within the composite, and thus the electron conduction path and the ion conduction path for fluorination/defluorination reactions necessary for the electrochemical reaction can be easily formed.

The type of carbon black is not particularly limited, and examples thereof include furnace black, Ketjen black, acetylene black and the like.

Although the average particle diameter of the carbon black is not particularly limited, the average particle diameter is preferably in a range of 20 to 50 nm.

The average particle diameter of the carbon black is in the range of 20 to 50 nm, and thus an electrode having high electron conductivity with a small weight can be formed.

[Composition]

(Aluminum)

The ratio of aluminum to the entire negative electrode material mixture composite for a fluoride ion secondary battery according to the present invention is preferably 1 to 25% by mass, and is further preferably in a range of 5 to 13% by mass.

In the negative electrode material mixture composite for a fluoride ion secondary battery according to the present invention, the ratio of aluminum is in the range described above, and thus the capacity of the obtained fluoride ion secondary battery per weight is increased.

(Modified Aluminum Fluoride Material)

The ratio of the modified aluminum fluoride material to the entire negative electrode material mixture composite for a fluoride ion secondary battery according to the present invention is preferably 5 to 25% by mass, and is further preferably in a range of 5 to 20% by mass.

In the negative electrode material mixture composite for a fluoride ion secondary battery according to the present invention, the ratio of the modified aluminum fluoride material is in the range described above, and thus the capacity of the obtained fluoride ion secondary battery per weight is increased.

(Ratio Between Aluminum and Modified Aluminum Fluoride Material)

In the negative electrode material mixture composite for a fluoride ion secondary battery according to the present invention, a mass ratio between aluminum and the modified aluminum fluoride material serving as the negative electrode active material is preferably in a range of 1:9 to 9:1. The mass ratio is further preferably in a range of 2:8 to 8:2, and is most preferably in a range of 2:8 to 5:5.

In the negative electrode material mixture composite for a fluoride ion secondary battery used in the present invention, the mass ratio between aluminum and the modified aluminum fluoride material serving as the negative electrode active material is in the range described above, and thus a discharge capacity per weight at the time of charge and discharge is increased, and coulomb efficiency is enhanced.

(Fluoride Ion Conductive Fluoride)

The ratio of the fluoride ion conductive fluoride to the entire negative electrode material mixture composite for a fluoride ion secondary battery according to the present invention is preferably 70 to 90% by mass, and is further preferably in a range of 80 to 90% by mass.

In the negative electrode material mixture composite for a fluoride ion secondary battery according to the present invention, the ratio of the fluoride ion conductive fluoride is in the range described above, and thus an electrode having high ion conductivity can be formed.

(Conductive Aid)

When the negative electrode material mixture composite for a fluoride ion secondary battery according to the present invention includes the conductive aid, the ratio of the conductive aid to the entire negative electrode material mixture composite for a fluoride ion secondary battery is preferably 5 to 25% by mass, and is further preferably in a range of 5 to 10% by mass.

In the negative electrode material mixture composite for a fluoride ion secondary battery according to the present invention, the ratio of the conductive aid is in the range described above, and thus an electrode having high electron conductivity can be formed.

(Ratio Between Aluminum, Modified Aluminum Fluoride Material, Fluoride Ion Conductive Fluoride and Conductive Aid)

In the negative electrode material mixture composite for a fluoride ion secondary battery according to the present invention, a mass ratio between aluminum, the modified aluminum fluoride material, the fluoride ion conductive fluoride and the conductive aid is preferably in a range of 1 to 25:5 to 25:70 to 90:5 to 25. The mass ratio is further preferably in a range of 5 to 13:5 to 20:80 to 90:5 to 10.

In the negative electrode material mixture composite for a fluoride ion secondary battery according to the present invention, the mass ratio between aluminum, the modified aluminum fluoride material, the fluoride ion conductive fluoride and the conductive aid is in the range described above, and thus the capacity per weight is increased.

<Method for Manufacturing Negative Electrode Material Mixture Composite for Fluoride Ion Secondary Battery>

A method for manufacturing the negative electrode material mixture composite for a fluoride ion secondary battery used in the present invention includes a mixture step and a complexing step.

[Mixture Step]

The mixture step in the method for manufacturing the negative electrode material mixture composite for a fluoride ion secondary battery used in the present invention is a step of mixing the negative electrode active material, the fluoride ion conductive fluoride and the carbon black to obtain a negative electrode material mixture, and in the present invention, the negative electrode active material includes aluminum and the modified aluminum fluoride material having pores caused by desorption of fluoride ions.

Aluminum and the modified aluminum fluoride material serving as the negative electrode active material, the fluoride ion conductive fluoride and the carbon black serving as the conductive aid are the same as those described above. Aluminum, the modified aluminum fluoride material, the fluoride ion conductive fluoride and the carbon black are preferably included as essential components, and other materials may be arbitrarily mixed.

A method for the mixing is not particularly limited, and it is preferable to weigh the desired masses of the individual components and to put them into the same space simultaneously or sequentially so as to mix them. When they are sequentially put, the order thereof is not particularly limited.

The aluminum fluoride ($AlF_3$) before being modified and the alkali metal or the alkali earth metal may be brought into contact in order to obtain the modified aluminum fluoride material serving as the negative electrode active material before being mixed with the other components of the negative electrode material mixture composite for a fluoride ion secondary battery used in the present invention or under presence of the other components.

[Complexing Step]

The complexing step is a step of subjecting the negative electrode material mixture obtained in the mixture step to grinding and mixing processing to complex the negative electrode active material, the fluoride ion conductive fluoride and the carbon black so as to obtain the negative electrode material mixture composite for a fluoride ion secondary battery.

In the complexing step, the negative electrode active material, the fluoride ion conductive fluoride and the carbon black included in the negative electrode material mixture are alloyed.

Since aluminum serving as the negative electrode active material is a relatively soft material, aluminum is carried by the fluoride ion conductive fluoride which is a hard material due to an impact caused by the grinding and mixing processing. Then, it is considered that since aluminum is nanoparticles, aluminum can be thermally diffused within the composite due to heat caused by the grinding and mixing processing, and that consequently, the composite is alloyed.

The grinding and mixing processing for alloying the negative electrode material mixture is not particularly limited as long as the grinding and mixing processing is a method in which the negative electrode material mixture can be mixed while being ground under an inert atmosphere.

Although the grinding and mixing processing may be dry grinding or wet grinding, since an oxide film on the surface of the particles peels off at the time of the grinding and mixing processing to cause an active surface to appear, the dry grinding under an inert atmosphere is preferable.

In particular, the grinding and mixing processing is preferably performed with a ball mill. Since the ball mill is sealed, the mixing ratio is not changed during grinding and dispersion, the stable grinding and mixing processing can be performed. Among types of ball mills, a planetary ball mill is preferable because large griding power is produced to be able to perform fine grinding and reduce the grinding time. Although the conditions of the grinding and mixing when the ball mill is used are not particularly limited, for example, the grinding and mixing is performed at 400 rpm for 10 hours.

<Positive Electrode for Fluoride Ion Secondary Battery>

The positive electrode of a fluoride ion secondary battery needs to be able to discharge fluoride ions ($F^-$) at the time of discharge and to store fluoride ions ($F^-$) at the time of charge.

The positive electrode for a fluoride ion secondary battery which forms the fluoride ion secondary battery of the present invention includes a positive electrode active material. As long as the positive electrode active material for a fluoride ion secondary battery is included, the other configurations are not particularly limited.

For example, the positive electrode for a fluoride ion secondary battery can be obtained by applying, on a current collector, a mixture including the positive electrode active material and a binder and drying the mixture.

[Positive Electrode Active Material]

In the fluoride ion secondary battery of the present invention, the positive electrode active material is copper. For fluoride ion secondary batteries in which $Cu/CuF_2$ is a positive electrode active material, the results of charge/discharge tests indicating high utilization rates and reversible reactions are reported (see Non-Patent Documents 1 and 2).

In general, in a fluoride ion secondary battery, a positive electrode material is selected which provides a sufficiently high standard electrode potential to the standard electrode potential of the negative electrode, and thus it is possible to realize the enhanced characteristics of the battery and a desired battery voltage. As shown in FIG. 1, as compared with aluminum serving as the negative electrode active material in the fluoride ion secondary battery of the present invention, the potential of copper provides a sufficiently high standard electrode potential.

Furthermore, since copper does not include fluoride ions, copper is selected as the positive electrode in the fluoride ion secondary battery of the present invention, and thus a battery which starts from charge can be realized. In other words, it is possible to manufacture the battery in a discharged state where an energy state is low, and thus the stability of the active material within the electrode can be enhanced.

<Solid Electrolyte>

The solid electrolyte included in the fluoride ion secondary battery of the present invention is not particularly limited, and a material which is known as a solid electrolyte for a fluoride ion secondary battery can be applied.

<Method for Manufacturing Fluoride Ion Secondary Battery>

A method for manufacturing the fluoride ion secondary battery of the present invention is not particularly limited, and a method which is known as a method for manufacturing a fluoride ion secondary battery can be applied.

EXAMPLES

Although Example and the like in the present invention will then be described, the present invention is not limited to Example and the like described below.

Example 1

[Production of Negative Electrode Material Mixture Composite for Fluoride Ion Secondary Battery]

A modified aluminum fluoride material was used which was obtained by using aluminum and lithium (Li) metal as a negative electrode active material to modify aluminum fluoride ($AlF_3$), and $CeBaF_{2.95}$ serving as a fluoride ion conductive fluoride and acetylene black serving as a conductive aid were used to produce a negative electrode material mixture composite for a fluoride ion secondary battery.

In the production of the negative electrode material mixture composite for a fluoride ion secondary battery, a first composite obtained by a first mixture step and a first complexing step and a second composite obtained by a second mixture step and a second complexing step were mixed in a third mixture step, and a third complexing step was performed and then the negative electrode material mixture composite for a fluoride ion secondary battery used in the present example was finally obtained. In the present example, the modified aluminum fluoride material was manufactured in the second mixture step.

(First Mixture Step)

Aluminum, $Ce_{0.95}Ba_{0.05}F_{2.95}$ and the acetylene black were weighed as shown in table 1. After the weighing, $Ce_{0.95}Ba_{0.05}F_{2.95}$ and the acetylene black were put into a ball mill container made of silicon nitride (made by Fritsch Co., Ltd. in Germany, internal volume: 80 cc, PL-7 dedicated container), and then aluminum was put thereinto. Furthermore, 40 g of balls having a diameter of 2 mm and made of silicon nitride was put thereinto, and the ball mill container was sealed.

(First Complexing Step)

The sealed ball mill container was rotated at a rotation speed of 400 rpm for 10 hours to perform grinding and mixing processing, and thus the first composite was obtained. After the grinding and mixing processing, the processed powder was collected.

(Second Mixture Step: Manufacturing of Modified Aluminum Fluoride Material)

The aluminum fluoride ($AlF_3$), the lithium (Li) metal, $Ce_{0.95}Ba_{0.05}F_{2.95}$ and the acetylene black were weighed as shown in table 1. After the weighing, the aluminum fluoride ($AlF_3$) and the lithium (Li) metal were put into a ball mill container made of silicon nitride (made by Fritsch Co., Ltd. in Germany, internal volume: 45 cc, PL-7 dedicated container), 40 g of balls having a diameter of 2 mm and made of silicon nitride was further put thereinto and the ball mill container was sealed. Then, the ball mill container was rotated at a rotation speed of 600 rpm for 30 hours to perform grinding and mixing processing. After the grinding and mixing processing, $Ce_{0.95}Ba_{0.05}F_{2.95}$ and the acetylene black were put into the ball mill container, and the ball mill container was sealed.

Since each of the aluminum fluoride ($AlF_3$) and the lithium (Li) metal was highly reactive with water, the weighing and the preliminary mixing of the raw materials were performed within a glove box (made by Miwa Manufacturing Co., Ltd., model DBO-1.5BNK-SQ1).

(Second Complexing Step)

The sealed ball mill container was rotated at a rotation speed of 200 rpm for 10 hours to perform grinding and mixing processing, and thus the second composite was obtained. After the grinding and mixing processing, the processed powder was collected.

(Third Mixture Step)

The first composite obtained as described above was put into the ball mill container where the second composite obtained as described above and 40 g of balls having a diameter of 2 mm and made of silicon nitride were present, and the container was sealed.

(Third Complexing Step)

The sealed ball mill container was rotated at a rotation speed of 200 rpm for 10 hours to perform grinding and mixing processing, and thus the negative electrode material mixture composite for a fluoride ion secondary battery used in the present example was finally obtained. After the grinding and mixing processing, the processed powder was collected.

TABLE 1

| | | | Example 1 | | Comparative Example 1 | Comparative Example 2 | |
|---|---|---|---|---|---|---|---|
| First composite | Negative electrode active material | Type | Aluminum | | Modified aluminum fluoride | Aluminum | |
| | | Average particles diameter (nm) | 40 | | 49 | 40 | |
| | | Mixed amount (mg) | 200 | | 200 | 200 | |
| | Fluoride ion conductive fluoride | Type | $CeBaF_{2.95}$ | | $CeBaF_{2.95}$ | $CeBaF_{2.95}$ | |
| | | Average particle diameter (nm) | 10 | | 10 | 10 | |
| | | Mixed amount (mg) | 1680 | | 1633 | 1680 | |
| | Conductive aid | Type | Acetylene black | | Acetylene black | Acetylene black | |
| | | Average particle diameter (nm) | 35 | | 35 | 35 | |
| | | Mixed amount (mg) | 120 | | 117 | 120 | |
| Second composite | Negative electrode active material | Type | Aluminum fluoride | Lithium metal | — | Aluminum fluoride | Lithium metal |
| | | Average particle diameter (nm) | 49 | (Foil) | — | 49 | (Foil) |
| | | Mixed amount (mg) | 225 | 25 | — | 225 | 25 |
| | Fluoride ion conductive fluoride | Type | $CeBaF_{2.95}$ | | — | $CeBaF_{2.95}$ | |
| | | Average particle diameter (nm) | 10 | | — | 10 | |
| | | Mixed amount (mg) | 1633 | | — | 1633 | |
| | Conductive aid | Type | Acetylene black | | — | Acetylene black | |
| | | Average particle diameter (nm) | 35 | | — | 35 | |
| | | Mixed amount (mg) | 117 | | — | 117 | |
| Positive electrode | Positive electrode active material | Type | Cu | | Cu | Pb | |

<Production of Fluoride Ion Secondary Battery>

A fluoride ion secondary battery was produced using materials below by the following method.

(Negative Electrode Material Mixture Powder)

The negative electrode material mixture composite for a fluoride ion secondary battery produced as described above was used.

(Solid Electrolyte)

$La_{0.95}Ba_{0.05}F_{2.95}$ (LBF) which was a tysonite-based solid electrolyte was used. The LBF was a known compound (see Non-Patent Documents 3 to 5), and thus the LBF was produced by a method disclosed in Non-Patent Document 5.

Non-Patent Document 3: ACS Appl. Mater. Interfaces 2014, 6, 2103-2110

Non-Patent Document 4: J. Phys. Chem. C 2013,117, 4943-4950

Non-Patent Document 5: J. Phys. Chem. C 2014,118, 7117-7129

(Positive Electrode Material Mixture Powder)

18% by mass of copper powder (made by Kojundo Chemical Lab. Co., Ltd.), 7% by mass of barium fluoride (Sigma-Aldrich), 70% by mass of $Ce_{0.95}Ba_{0.05}F_{2.95}$ and 5% by mass of acetylene black (made by Denka Company Limited) were mixed with a ball mill, and the resulting mixture was used as positive electrode material mixture powder.

(Production Method)

Figure 2:
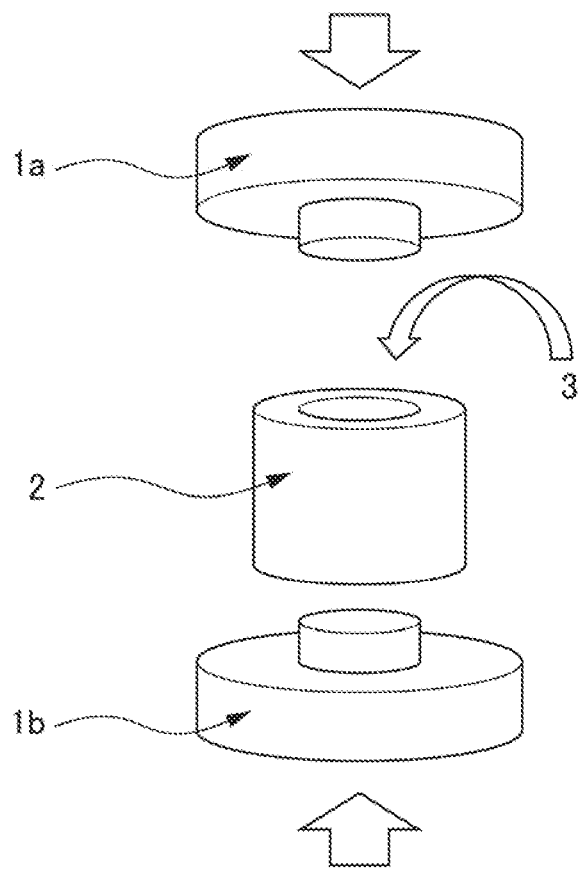
FIG. 2 is a diagram showing a method for producing fluoride ion secondary batteries in Example and Comparative Examples.

FIG. 2 shows a method for producing the fluoride ion secondary battery. As shown in FIG. 2, a tablet molder (1a and 1b) was used, battery materials 3 were sequentially put into a ceramic pipe 2 to be pressed at a pressure of 40 MPa from above and below and thus a pellet-type cell obtained by powder pressure molding was produced. As the battery materials 3, gold foil (made by the Nilaco Corporation, 99.9+%, thickness: 10 μm) serving as a negative electrode current collector, 30 mg of the negative electrode material mixture powder described above, 200 mg of the solid electrolyte, 10 mg of the positive electrode material mixture powder and gold foil (made by the Nilaco Corporation, purity: 99.9+%, thickness: 10 μm) serving as a positive electrode current collector were sequentially put.

Figure 3:
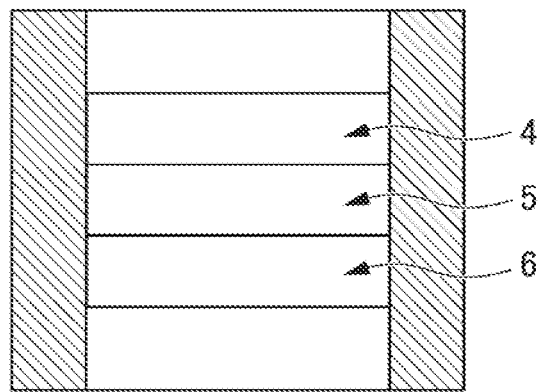
FIG. 3 is a cross-sectional view of the fluoride ion secondary batteries produced in Example and Comparative Examples.

FIG. 3 shows a cross-sectional view of the fluoride ion secondary battery which was produced. As shown in FIG. 3, in a state where the pellet-type fluoride ion secondary battery produced was sandwiched by the tablet molder, a positive electrode material mixture layer 4, a solid electrolyte layer 5 and a negative electrode material mixture layer 6 were stacked.

Comparative Example 1

[Production of Negative Electrode Material Mixture Composite for Fluoride Ion Secondary Battery]

Modified aluminum fluoride disclosed in Japanese Unexamined Patent Application, Publication No. 2018-059703 was used as a negative electrode active material, $Ce_{0.95}Ba_{0.05}F_{2.95}$ was used as a fluoride ion conductive fluoride and acetylene black was used as a conductive aid to produce a negative electrode material mixture for a fluoride ion secondary battery.

An operation for obtaining the modified aluminum fluoride is described below.

[Production of Modified Aluminum Fluoride]

Lithium (Li) metal was used, and thus aluminum fluoride ($AlF_3$) was formed into the modified aluminum fluoride.
(Weighing and Preliminary Mixing of Raw Materials)

The aluminum fluoride ($AlF_3$) and the lithium (Li) metal were weighed such that aluminum fluoride:lithium (mole rate) was 90:10 and that the total amount was 6.0 grams. A mortar and a pestle made of agate were used to perform preliminary mixing for about 1 hour, and thus the mixed powder of raw materials was obtained.

Since each of the aluminum fluoride ($AlF_3$) and the lithium (Li) metal was highly reactive with water, the weighing and the preliminary mixing of the raw materials were performed within a glove box (made by Miwa Manufacturing Co., Ltd., model DBO-1.5BNK-SQ1).
(Mixture Step)

The modified aluminum fluoride obtained as described above, $Ce_{0.95}Ba_{0.05}F_{2.95}$ and the acetylene black were weighed as shown in table 1. After the weighing, aluminum was put into the ball mill container made of silicon nitride (made by Fritsch Co., Ltd. in Germany, internal volume: 80 cc, PL-7 dedicated container), and then $Ce_{0.95}Ba_{0.05}F_{2.95}$ and the acetylene black were put thereinto. Furthermore, 40 g of balls having a diameter of 2 mm and made of silicon nitride was put thereinto, and the ball mill container was sealed.
(Complexing Step)

The sealed ball mill container was rotated at a rotation speed of 200 rpm for 10 hours to perform grinding and mixing processing, and thus a negative electrode material mixture composite for a fluoride ion secondary battery was obtained. After the grinding and mixing processing, the processed powder was collected.

[Production of Fluoride Ion Secondary Battery]

As in Example 1, a fluoride ion secondary battery was produced.

Comparative Example 2

[Production of Negative Electrode Material Mixture Composite for Fluoride Ion Secondary Battery]

As in Example 1, a negative electrode material mixture composite for a fluoride ion secondary battery was produced.
[Production of Fluoride Ion Secondary Battery]

As in Example 1, a fluoride ion secondary battery was produced except that as a positive electrode material mixture, the following materials were used and that as a positive electrode current collector and part of a positive electrode, lead foil (made by the Nilaco Corporation, purity: 99.99%, thickness: 200 μm) was used.
(Positive Electrode Material Mixture Powder)

63.7% by mass of lead fluoride powder (made by Kojundo Chemical Lab. Co., Ltd.), 29.6% by mass of tin fluoride (made by Kojundo Chemical Lab. Co., Ltd.) and 6.7% by mass of acetylene black (made by Denka Company Limited) were mixed with a ball mill, and were thereafter burned at 400° C. for 1 hour under an argon atmosphere to form into positive electrode material mixture powder.
<Evaluations of Fluoride Ion Secondary Battery>
[Constant Current Charge/Discharge Test]

The pellet-type fluoride ion secondary batteries obtained in Example and Comparative Examples were heated to 140° C. under a vacuum environment, and thus an electrochemical reaction (charge/discharge reactions) was performed. Specifically, for the fluoride ion secondary batteries produced in Example and Comparative Examples, a potentiometer galvanostat device (made by Solartron, SI1287/1255B) was used to perform a constant current charge/discharge test with a current of 0.02 mA for charge and a current of 0.01 mA for discharge at a lower limit voltage of 0.5 V and an upper limit voltage of 3.8 V by application of the current from a charge current. For the fluoride ion secondary battery produced in Comparative Example 2 where the positive electrode was lead, a constant current charge/discharge test was performed at a lower limit voltage of 0.1 V and an upper limit voltage of 2.35 V by application of the current from the charge current. Charge/discharge curves are shown in FIG. 4.

Figure 4:
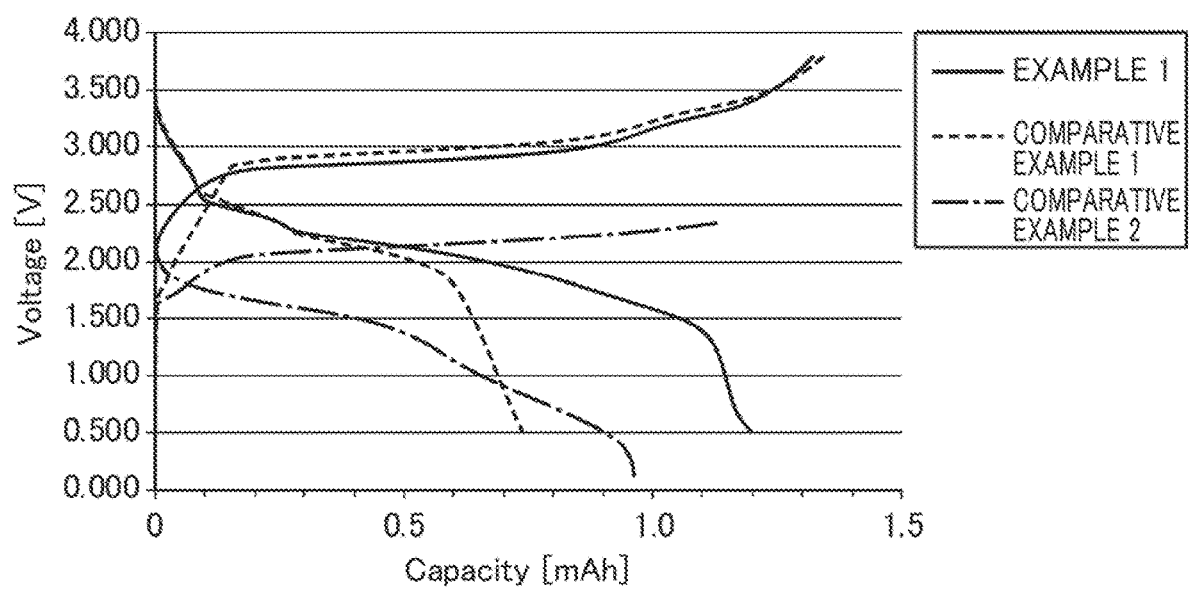
FIG. 4 is charge/discharge curves of the fluoride ion secondary batteries produced in Example and Comparative Examples.

As shown in FIG. 4, the fluoride ion secondary battery produced in Example 1 can start from charge, and as compared with the fluoride ion secondary batteries produced in Comparative Examples 1 and 2, initial charge/discharge efficiency is high, and a high voltage is provided. It is considered that this is mainly because the side reactions of the positive electrode and the negative electrode were reduced and copper having a high potential was used as the positive electrode.

EXPLANATION OF REFERENCE NUMERALS 1a, 1b: tablet molder
2: ceramic pipe
3: battery material
4: positive electrode material mixture layer
5: solid electrolyte layer
6: negative electrode material mixture layer

The invention claimed is:

1. A fluoride ion secondary battery including fluoride ions as charge carriers comprising: a negative electrode; a solid electrolyte; and a positive electrode, wherein the negative electrode comprises a negative electrode material mixture composite comprising a negative electrode active material and a fluoride ion conductive fluoride, the negative electrode active material comprises aluminum and a modified aluminum fluoride material having sections where fluoride ions have been desorbed, wherein a ratio of aluminum in the negative electrode material mixture composite is a value in the range of 1 to 25% by mass, wherein a ratio of the modified aluminum fluoride material in the negative electrode material mixture composite is a value in the range of 5 to 25% by mass, the positive electrode comprises a positive electrode active material, and the positive electrode active material is copper.

2. The fluoride ion secondary battery according to claim 1, wherein the sections serve as a starting point of a defluorination reaction in which the negative electrode discharges fluoride ions at a time of charge and a refluorination reaction in which the negative electrode stores fluoride ions at a time of discharge.

3. The fluoride ion secondary battery according to claim 1, wherein the sections are a region where fluorine atoms were present in the aluminum fluoride before modification.

4. The fluoride ion secondary battery according to claim 1, wherein the aluminum is in the form of particles with an average particle diameter of 10 nm to 200 nm.

5. The fluoride ion secondary battery according to claim 1, wherein the negative electrode material mixture composite further comprises carbon black.

6. The fluoride ion secondary battery according to claim 1, wherein the modified aluminum fluoride material contains lithium.

* * * * *